United States Patent
Calderon et al.

(10) Patent No.: US 6,629,011 B1
(45) Date of Patent: Sep. 30, 2003

(54) AUTOINITIALIZATION IN A THREE-DIMENSIONAL MODELING MACHINE

(75) Inventors: Joseph L. Calderon, Carlsbad, CA (US); David L. Pollard, Mountain Center, CA (US); J. Samuel Batchelder, Somers, NY (US)

(73) Assignee: Stratasys, Inc., Eden Prairie, MN (US)

( * ) Notice: Subject to any disclaimer, the term of this patent is extended or adjusted under 35 U.S.C. 154(b) by 410 days.

(21) Appl. No.: 09/618,169

(22) Filed: Jul. 17, 2000

(51) Int. Cl.$^7$ .............................................. G06F 19/00
(52) U.S. Cl. ...................... 700/119; 264/401; 425/375; 700/192; 700/195
(58) Field of Search .............................. 700/57, 60–62, 700/64, 114, 117–119, 123, 124, 160, 163, 186, 190, 192–195, 302, 98; 702/33, 105, 168; 425/135, 375; 264/497, 308, 401

(56) References Cited

U.S. PATENT DOCUMENTS

| | | | |
|---|---|---|---|
| 4,328,553 A | * 5/1982 | Fredriksen et al. ......... 700/192 |
| 4,642,752 A | * 2/1987 | Debarbieri et al. ......... 700/160 |
| 4,749,347 A | 6/1988 | Valavaara .................. 425/135 |
| 5,099,090 A | * 3/1992 | Allan et al. ................. 174/257 |
| 5,121,329 A | 6/1992 | Crump ........................ 700/119 |
| 5,271,896 A | * 12/1993 | Jakubowicz et al. .......... 422/63 |
| 5,303,141 A | 4/1994 | Batchelder et al. ........... 700/29 |
| 5,340,433 A | 8/1994 | Crump ........................ 156/578 |
| 5,402,351 A | 3/1995 | Batchelder et al. ......... 700/119 |
| 5,428,548 A | * 6/1995 | Pilborough et al. ......... 700/195 |
| 5,764,521 A | 6/1998 | Batchelder et al. ......... 700/196 |
| 5,939,008 A | 8/1999 | Comb et al. ................. 264/308 |
| 5,968,561 A | * 10/1999 | Batchelder et al. ......... 425/375 |
| 6,004,124 A | * 12/1999 | Swanson et al. ............ 425/375 |

* cited by examiner

*Primary Examiner*—Leo Picard
*Assistant Examiner*—Paul Rodriguez
(74) *Attorney, Agent, or Firm*—Kinney & Lange, P.A.

(57) ABSTRACT

Disclosed are a method and apparatus for initializing an additive process computer-controlled three-dimensional modeling machine which builds models on a modeling platform. The method, without operator intervention, senses the top surface of a substrate or other object mounted on the platform at a variety of preselected x, y locations and records the z-axis positions of the platform corresponding to the sensing of the object. Using the recorded z-axis positions, a z-start position for the modeling platform is calculated. The platform can be automatically placed at the calculated z-start position. The recorded z-axis positions can further be used to define a plane fitted to the substrate top surface. Optionally, the model can be built in a coordinate system defined by the plane.

27 Claims, 5 Drawing Sheets

AUTOINITIALIZATION IN A THREE-DIMENSIONAL MODELING MACHINE

BACKGROUND OF THE INVENTION

The present invention relates to the fabrication of three-dimensional objects using additive process modeling techniques. More particularly, the invention relates to modeling machines which form three-dimensional objects by depositing modeling material onto a substrate mounted to a modeling platform.

Additive process modeling machines make three-dimensional models by building up a modeling medium, usually in planar layers, based upon design data provided from a computer aided design (CAD) system. A mathematical description of a physical part to be created is split into (usually) planar layers, and those layers are individually shaped and applied to produce the final part. Three-dimensional models are used for functions including aesthetic judgments, proofing the mathematical CAD model, forming hard tooling, studying interference and space allocation, and testing functionality. The dominant application of layered manufacturing in recent years has been for rapid prototyping.

Examples of apparatus and methods for making three-dimensional models by depositing solidifiable modeling material are described in Crump U.S. Pat. No. 5,121,329, Batchelder, et al. U.S. Pat. No. 5,303,141, Crump U.S. Pat. No. 5,340,433, Batchelder, et al. U.S. Pat. No. 5,402,351, Crump et al. U.S. Pat. No. 5,503,785, Abrams et al. U.S. Pat. No. 5,587,913, Danforth, et al. U.S. Pat. No. 5,738,817, Batchelder, et al. U.S. Pat. No. 5,764,521 and Comb et al. U.S. Pat. No. 5,939,008, all of which are assigned to Stratasys, Inc., the assignee of the present invention. An extrusion head extrudes solidifiable modeling material in a fluent strand (also termed a "bead" or "road") from a nozzle onto a base. The base comprises a modeling substrate which is removably affixed to a modeling platform. The extruded material is deposited layer-by-layer in areas defined from the CAD model, as the extrusion head and the base are moved relative to each other by mechanical means in three dimensions. The finished model is removed from the substrate. A solidifiable material which adheres to the previous layer with an adequate bond upon solidification is used as the modeling material. Thermoplastic materials have been found particularly suitable for these deposition modeling techniques.

Other additive process manufacturing techniques include depositing UV curable polymers as in Masters U.S. Pat. No. 5,134,569; jetting of droplets of material as in Helinski U.S. Pat. No. 5,136,515; extruding a settable plastic in vertical strips as in Valaaara U.S. Pat. No. 4,749,347; laser welding deposition as in Pratt U.S. Pat. No. 5,038,014; stacking and adhering planar elements as in DiMatteo U.S. Pat. No. 3,932,923; and applying shaped layers of paper as in Hull U.S. Pat. No. 5,192,559.

In additive process three-dimensional modeling machines utilizing manufacturing techniques such as those described above, the model is built up on a base typically comprising a substrate mounted on a modeling platform. The material being deposited must adhere to the substrate to form a foundation layer over which the remaining layers of the object are deposited. The substrate stabilizes the model as it is built up, and facilitates removal of the model from the modeling machine when the model is complete.

It is preferred that parts deposited on the modeling substrate be strongly adhered thereto to overcome two effects. First, strains generated within the extruded material tend to warp the deposited structures unless the structures are supported in their correct orientation. The substrate is important in serving to avoid localized shrinkage in the foundation layer. Second, in some deposition processes, there are forces such as pull from an extrusion nozzle and centripetal acceleration on parts that are not stationary, that tend to distort the deposited structures. A delamination of the foundation layer from the substrate during the building of the object could result in a total failure in forming the object. Further, since the removable substrate becomes a defining surface for the object being built, it must be held in a well-defined configuration. Typically, the substrate is held in a configuration approximating a plane.

The Crump '329 and '433 patents disclose a foam plastic material for use as a modeling substrate.: A blue polystyrene material manufactured by Dow-Corning Corp under that name and having a compression strength of 30 psi is identified as particulary suitable coarse, porous structure. The Crump '329 and '433 patents also disclose modeling on a wire mesh sandpaper substrate, and on a water soluble wax. The Batchelder et al. '521 patent discloses a sheet of magnetic material for use as a modeling substrate, wherein the modeling platform includes a magnet for attracting the sheet, while the Comb '008 patent discloses a flexible sheet substrate held down by vacuum forces.

In rapid prototyping systems sold in the past by Stratasys, Inc., a preferred substrate material has been a polymer foam. A foam slab substrate has proven particularly suitable for supporting models made by extrusion-based deposition modeling techniques. The porosity and compressibility of foam allows foundation layers of modeling material to be buried into the foam, which increases stability of the model as is it built up.

Before building up a model in commercially available modeling machines which build a model on a substrate mounted to a platform which moves along a z-axis, the z-axis position of the platform requires initialization. For example, in the Stratasys FDM® modeling machines, the operator manually moves the modeling platform up or down to place an extrusion nozzle at a correct position with respect to the substrate. Nozzle tip depth is typically set at one location of the substrate. In the Stratasys FDM® machines that built the model on a foam slab substrate, the optimal position of the extrusion nozzle is below the top surface of the foam, at a depth so that the first two extruded layers of modeling material will be buried in the foam. The first two layers extruded into the foam substrate provide a foundation to stabilize a model as it is built up. The z-axis accuracy for building on the foam should be ±5–10 mils. For rigid substrates, the z-axis accuracy desired in a Stratasys FDM® modeling system is ±2–4 mils.

Unfortunately, achieving the correct position of a modeling platform by a manual or "eyeball" method can be unreliable and time-consuming. As proper positioning requires operator judgment, it can be difficult for inexperienced users to identify the correct position. In the Stratasys FDM® machines, if the top surface of the substrate is not in an xy plane, nozzle tip depth will be incorrect at some locations of the substrate. This results in "modeling in air" or in too much "plowing" by the tip.

An incorrect z-start position can result in failure in forming a model. Additionally, if the substrate is not mounted flat to the platform, or if the substrate is deformed or improperly mounted so that it lacks a horizontal planar surface, the model quality will be adversely affected regardless of the z-start position selected. There exists a need for a z-axis initialization routine that does not require operator intervention or judgment.

SUMMARY OF THE INVENTION

The present invention is an automated apparatus and method for initialization of a computer-controlled modeling machine that builds up three-dimensional objects on a substrate supported by a modeling platform.

An autoinitialization method of the present invention will calculate a z-start position for the platform based upon z-axis positions of the platform obtained by sensing the substrate surface at multiple x, y positions. A method for determining the z-start position includes the steps of (a) positioning a plunging means above a pre-selected x, y location of a substrate mounted on the platform; (b) raising the platform to drive the substrate against the plunging means; (c) electrically detecting contact by the substrate against the plunging means and responsive providing a detection indication; (d) responsive to the detection indication of step (c), electrically recording the z-axis position of the platform corresponding to the detected contact between the substrate and the plunging means; (e) repeating steps (a) through (d) at a plurality of other pre-selected x, y locations of the substrate to obtain a plurality of recorded z-axis positions; and (f) using the plurality of recorded z-axis positions to calculate a z-start position of the platform. The modeling machine can then automatically position the platform at the calculated z-start position, without operator intervention. In optional additional steps, the method compares the recorded z-axis positions to verify that the substrate top surface is parallel to an xy-plane, and notifies the operator to re-load the substrate if the substrate surface does not approximate a horizontal plane. Or, step (f) can include a step of performing calculations based on the recorded z-axis positions to define a coordinate system fitted to the substrate surface. The model can then be built up in the coordinate system of the substrate.

In an alternative embodiment, the autoinitialization method of the present invention is used to determine whether a previously built model remains in the modeling machine by sensing and evaluating the z-height of the substrate or object carried by the platform. In a further alternate embodiment, the method is used to determine coordinates at which to continue building a model in the event of a power outage during the build process.

A sensor assembly for use in performing the method of the present invention includes a plunger, a sensor and an actuator. The plunger has a raised stored position and a lowered actuated position. The actuator switches the plunger from its stored position to its actuated position for use in executing the z-axis initialization routine and switches the plunger back to its stored position upon completion of the routine. In its actuated position, the plunger is movable by application of an upward force to a sensing location a predetermined distance above the actuated position. The sensor detects the presence of the plunger at the sensing location, providing an output signal when the plunger is detected. Upward force by the substrate against a downward facing tip of the plunger will drive the plunger up the predetermined distance. The sensor assembly can be mounted to the extrusion head of an extrusion-based modeling machine.

DETAILED DESCRIPTION OF THE PREFERRED EMBODIMENTS

Figure 1:
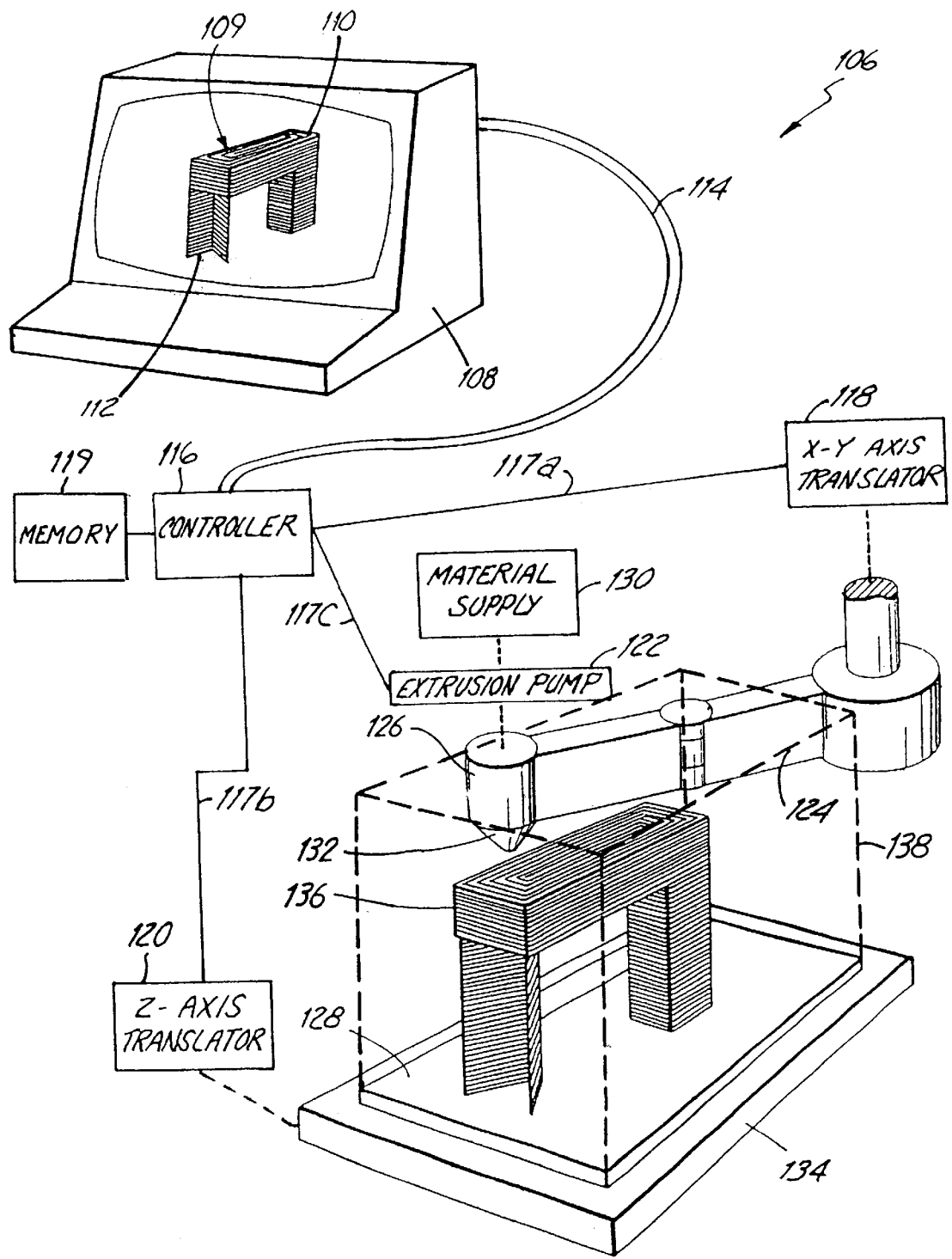
FIG. 1 is a schematic of a representative generic extrusion-based, layered modeling system.

FIG. 1 shows a generic representation of a extrusion-based layered modeling system 106, of a type known in the art, with which the present invention may be used. A computer aided design (CAD) program resident in a processor 108 generates a file describing the geometry of a part 109 to be created. A slicing program (shown as resident in processor 108 but which may alternatively be resident in a separate processor) algorithmically subdivides the file into volume elements 110 corresponding to shapes that can be extruded from a nozzle. Additional volume elements 112 are added as necessary to provide mechanical support to a part during its construction. The volume elements are sequentially ordered so that deposited material is supported appropriately.

An electronic controller 116, in response to receiving three-dimensional shape data from processor 108 over line 114, controls the extrusion of modeling material in an xyz-coordinate reference frame so that beads of modeling material are extruded layer-by-layer in a pattern defined by the volume elements 110 and 112. Controller 116 calculates and maintains in an associated memory 119 data representative of movements required to build the model. Based on this data, controller 116 sends control signals to an xy axis translator 118, a z-axis translator 120 and an extrusion pump 122, over output signal lines 117a, 117b and 117c, respectively. X-y axis translator 118 is an electromechanical device that moves a robotic arm 124, so as to sequentially position an extrusion head 126 carried by the arm 124 within an xy-plane with respect to a modeling substrate 128. Extrusion pump 122 synchronously provides modeling material from a material supply 130 to extrusion head 126. The extrusion head 126 terminates in a nozzle 132 through which the modeling material is extruded.

The modeling material is extruded from nozzle 132 onto the substrate 128, which is removably mounted onto a modeling platform 134 and is located in a modeling envelope 138. Modeling platform 134 moves in a z-direction under the control of z-axis translator 120. The z-axis as shown is oriented radially away from the earth's surface. In other implementations, however, it can be towards the ground or at some other chosen angle. Z-axis translator 120 incrementally lowers modeling platform 134 following deposition of a layer of modeling material, to build up a model 136 layer-by-layer on the substrate 128. After the model 136 is created, the model 136 is removed from the modeling system 106 and from the substrate 128.

An autoinitialization apparatus and method is now described which has application for finding the initial vertical position ("z-start" position) of a modeling platform in a three-dimensional modeling system, such as the type described above and shown in FIG. 1. It should be understood, however, that the teaching of this invention is not limited for use only with an extrusion-based layered manufacturing system of the type shown. That is, the invention has use also in other three-dimensional modeling systems which build up an object on a substrate removably mounted to a modeling platform.

Figure 2:
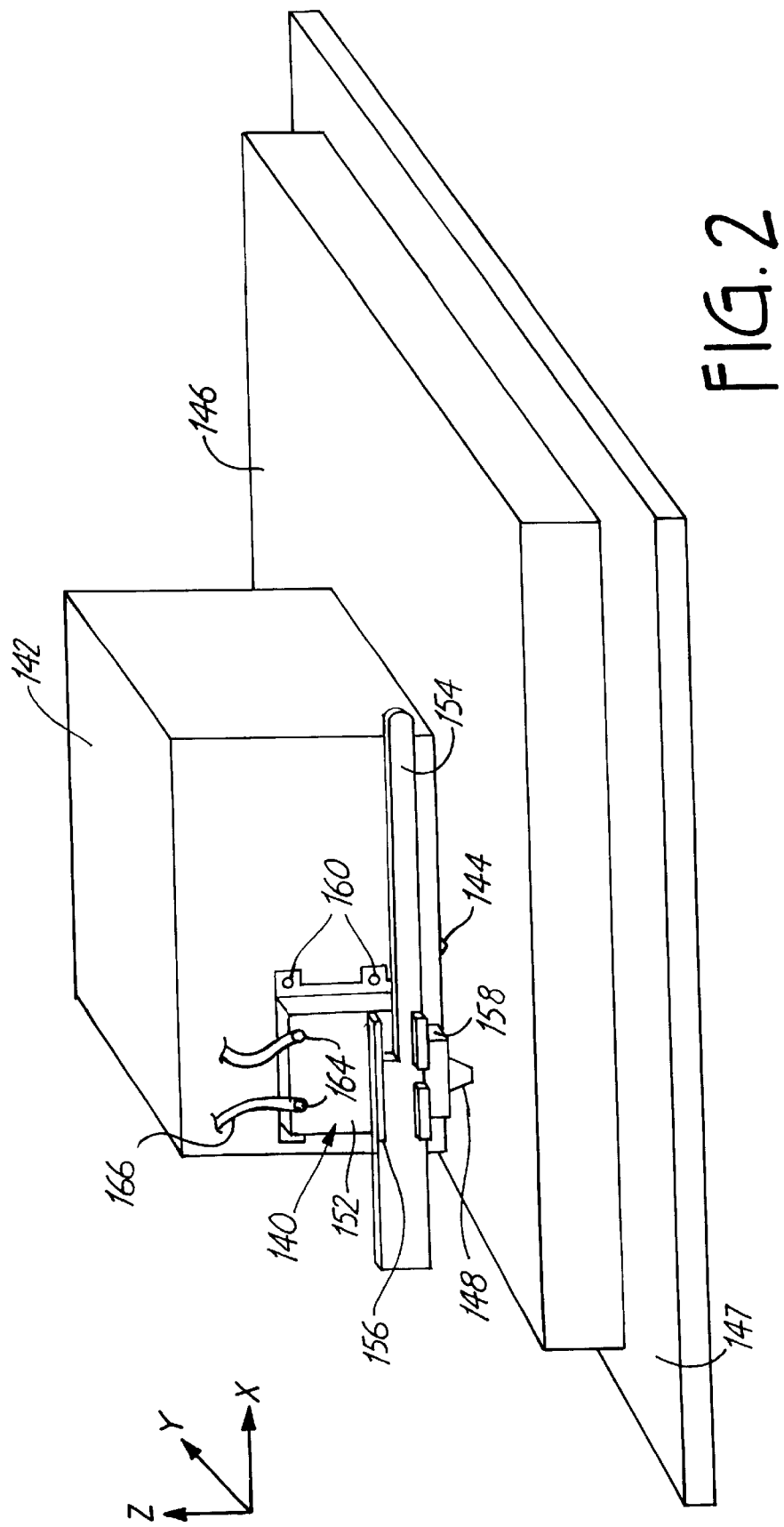
FIG. 2 is a perspective view of a preferred embodiment of the sensor assembly of the present invention in an actuated position, mounted to the extrusion head of an extrusion-based layered modeling machine and positioned over a pre-selected location of a substrate.

A sensor assembly 140 of the present invention, mounted to an extrusion head 142 of an extrusion-based layered modeling system, is shown in FIG. 2. The extrusion head 142 is shown positioned over a substrate 146 which is supported by a platform 147. Extrusion head 142 moves in an xy-plane and platform 147 moves along a z-axis, as described above with respect to FIG. 1. Extrusion head 142 terminates in a nozzle 144, from which modeling material is extruded onto substrate 146. As shown, substrate 146 is a slab substrate, such as foam. It should be noted, however, that while the apparatus and method of the present invention are particularly useful in finding a z-start position when modeling on a slab substrate, the present invention also has use when modeling on other types of bases, as will be appreciated by those skilled in the art.

Figure 3:
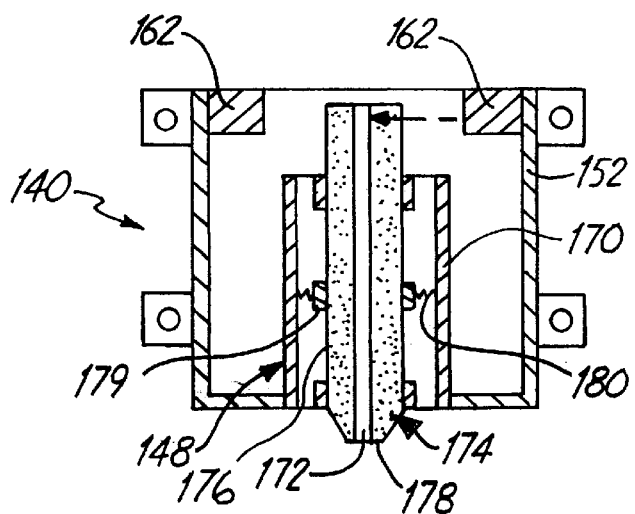
FIG. 3 is a cross-sectional view of the sensor assembly of FIG. 2, with the plunger in a stored position.
Figure 4:
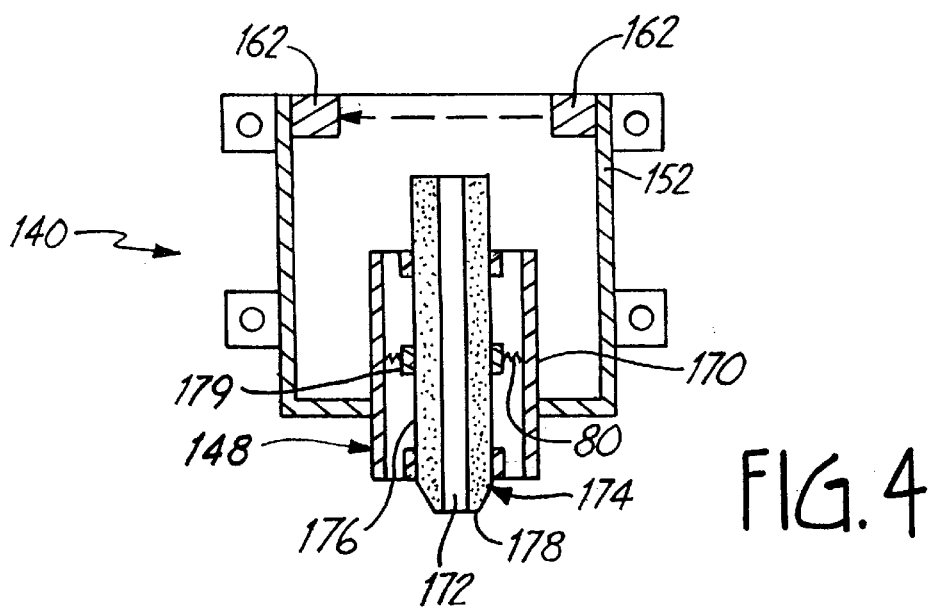
FIG. 4 is a cross-sectional view of the sensor assembly of FIG. 2, with the plunger in an actuated position.

Sensor assembly 140 includes a plunger 148, a housing 152, an actuator 154, and a sensor 162 (shown in FIGS. 3 and 4). Plunger 148 is reciprocably mounted to housing 152, so as to move vertically through an open bottom of the housing. Actuator 154, which is generally in the shape of a bar, is bounded between an upper guide 156 and a lower guide 158 of the housing 152 and slides horizontally from side-to-side in the housing 152 in response to application of horizontal force. Actuator 154 has a rightward position at which it extends past the extrusion head on a right side thereof, and a leftward position at which it extends past the extrusion head on a left side thereof. The side-to-side motion of actuator 154 alternately lowers and raises plunger 148.

Actuator 154 moves plunger 148 from a stored, raised position during periods of non-use, to a lowered, actuated position for use in executing a z-axis initialization routine which finds the z-start position for the platform 147. In its actuated position, the plunger 148 is movable by application of an upward force to a sensing location located a predetermined distance X above the actuated position. The sensor 162, which is mounted within housing 152, detects the presence of plunger 148 at the sensing location.

In FIG. 2, plunger 148 is shown in its actuated position, at which it protrudes from the bottom of the housing 152. A set of four connectors 160 mount the sensor assembly 140 to a backside of extrusion head 142. Sensor assembly 140 is mounted at a height such that plunger 148 in its actuated position extends a predetermined distance Y beneath the tip of nozzle 144.

When platform 147 is raised upward along the z-axis and plunger 148 is in its actuated position, a top surface of substrate 146 contacts plunger 148 and drives it up into housing 152. Sensor 162 senses when the plunger 148 has traveled upward the predetermined distance to the sensing location, and provides a signal indicating detection of the plunger. The signal from sensor 162 is provided on a signal line 166, which is coupled to controller 116 via one of terminals 164 of housing 152. Controller 116 monitors signal line 166. A change in the signal provided by sensor 162 indicates to the controller 116 that plunger 148 has moved the predetermined distance X. Controller 116 electrically records the z-axis coordinate of the platform 147 corresponding to the instant in time at which the signal change is detected. By monitoring the signal on line 166 and recording a z-axis position of platform 147 at which the change in signal is detected, the controller 116 is able to determine the z-axis coordinate of the platform 147 at which the top surface of substrate 146 contacted the plunger 148. The controller 116 uses this known z-axis position at which contact occurred to calculate the z-start position of platform 147, as described in more detail below.

FIGS. 3 and 4 show detail of one embodiment of the sensor assembly 140. FIG. 3 shows the plunger in a stored position, while FIG. 4 shows the plunger in an actuated position. As depicted in FIGS. 3 and 4, plunger 148 comprises a sub-housing 170 supporting a metal rod 172 embedded in a transparent casing 174. Casing 174 has a cylindrical body 176 terminating in a flat downward-facing tip 178. Tip 178 should have a contact area large enough that the force of contact of the tip 178 against the substrate 146 does not exceed an elastic yield limit of the substrate. A retaining clip 179 wraps around the casing 174 and a spring 180 is coupled between the clip 179 and the subhousing 170. As shown in FIGS. 3 and 4, sensor 162 is an optical sensor which generates an electrical output signal indicating whether a light beam emitted from a light generating part of the sensor is incident upon a light receiving part of the sensor. Suitable optical sensors are available from OPTEK Technologies, for example, model OPB380T51. The electrical output signal from sensor 162 changes state when the light beam of sensor 162 is occluded by plunger 148.

Figure 5:
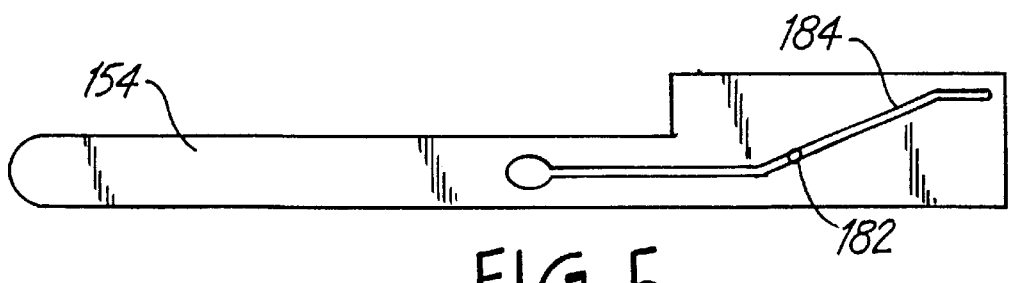
FIG. 5 is a rear view of the actuator.

A pin 182 and a spring 183 (not shown) couple the plunger 148 to the actuator 154, through a vertical slot in housing 152. Pin 182 slides in a ramped groove 184 along the back side of actuator 154, as shown in FIG. 5. When pin 182 is positioned at the upper level of groove 184, the plunger is held in the stored position. When pin 182 is moved to the lower level of groove 184, plunger 148 is moved down to the actuated position.

Those skilled in the art will recognize that many other embodiments of a sensor assembly are possible which may be used interchangeably with sensor assembly 140. Particularly, sensor 162 may be interchanged with any sensing means which can detect and signal contact between the plunger and the substrate, and need not be limited to an optical sensor. In other embodiments, sensor assembly 140 may, for example, use a magnet proximity switch, a Hall sensor, a Wiegand wire, a reed switch, a capacitive sensor or an inductance sensor. Likewise, plunger 148 may be interchanged with any plunging means which can be driven upward a predetermined distance by force of contact with the substrate such as a cam, pawl, cantilever, screw or membrane, or other mechanical structure. Or, contact between the plunger and the substrate can be sensed at their initial contact, in which case the plunging means need not move upward in response to contact with the substrate. For example, in one alternative embodiment, a pzt; voice coil or similar transducer is used to vibrate the plunger at a relatively high frequency (greater than 100 Hz, preferably greater than 10 kHz) and the transducer serves also as a sensing means to monitor the magnitude of the vibration. Contact is detected by the snubbing of the vibrational motion of the plunger.

Sensing techniques that do not necessarily involve the use of a plunging means can also be used in practice of the method of the present invention. Any manner of sensing a surface at selected coordinates to detect the corresponding z-axis coordinate may be used in practice of the invention. Suitable sensing means include but are not limited to, visible imaging devices, tactile detection devices and pneumatic detection devices. Examples of such devices are shown and discussed in Batchelder, et. al. U.S. Pat. No. 5,303,141 (see col.8, line 39 through col. 10, line 61), which is hereby incorporated by reference herein.

EXAMPLE 1

Figure 6:
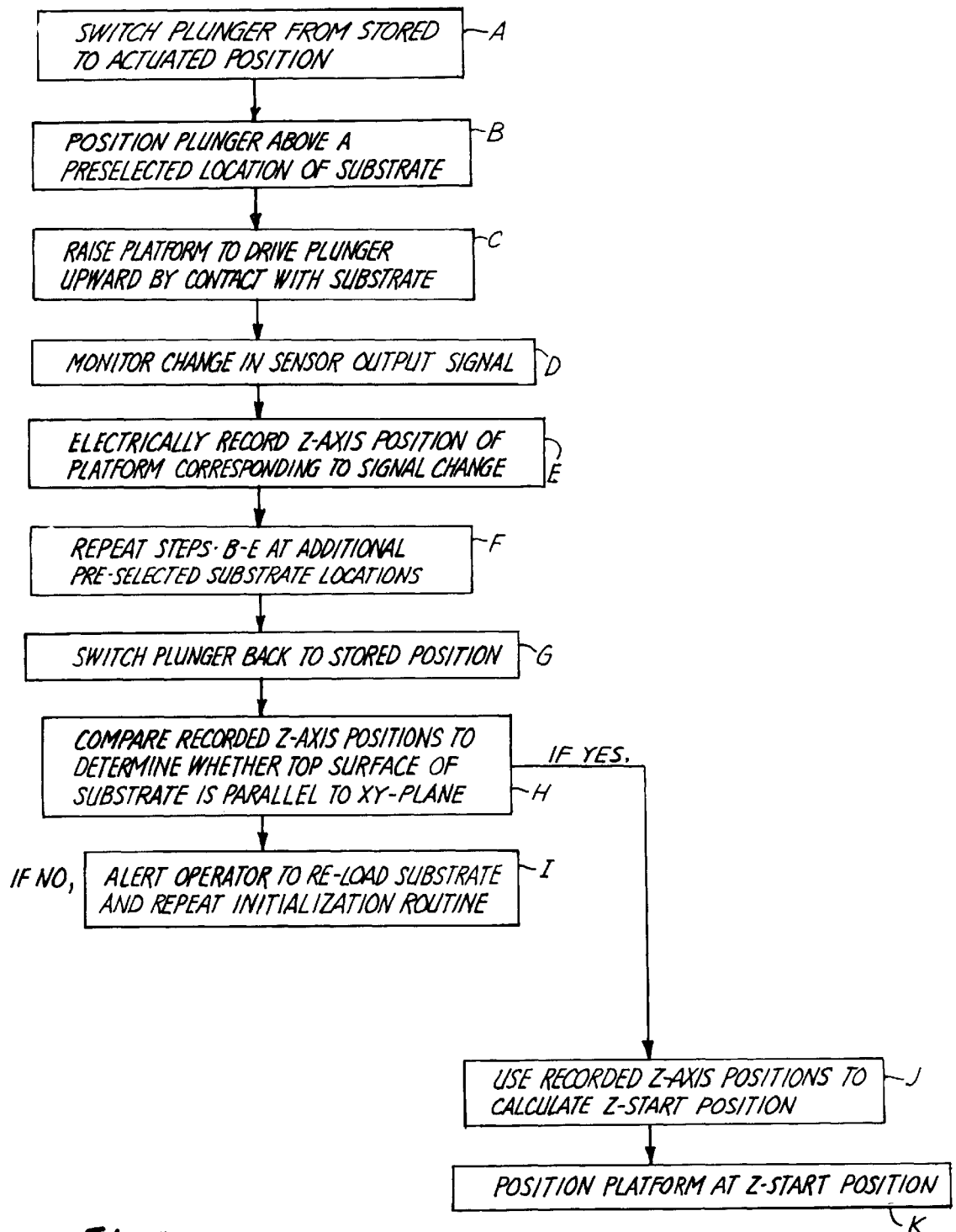
FIG. 6 is a process flow diagram illustrating the steps executed in performing a z-axis initialization routine according to the present invention.
Figure 7A:
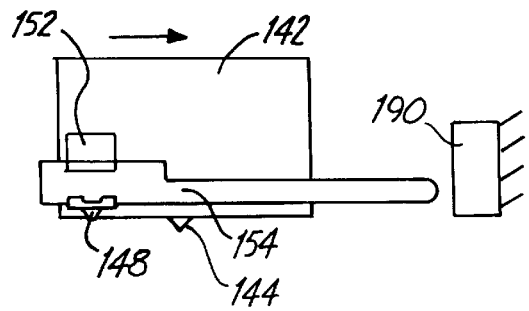
FIGS. 7a and 7b depict the operation of step A of FIG. 6.
Figure 7B:
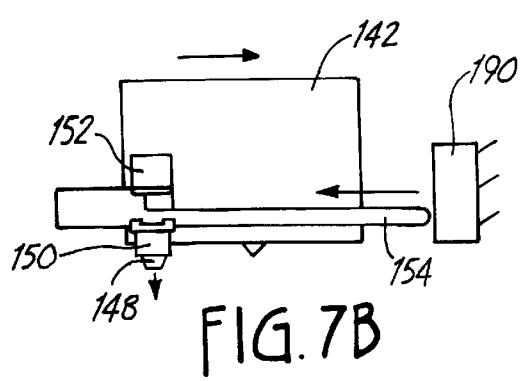

Referring now to the process flow diagram of FIG. 6, there is described a z-axis initialization routine in accordance with the present invention. The routine is performed after a substrate is loaded onto platform 147 and before model building is begun. Before executing the routine, the plunger 148 is typically in its stored position. In a first step (A), plunger 148 is switched from its stored position to its actuated position. In the embodiment described herein, this step is performed by moving the extrusion head 142 in the x-direction so as to drive actuator 154 against a first stationary block 190 located outside of the modeling envelope 138 to the right of extrusion head 142. The force of block 190 against actuator 154 pushes the actuator 154 to its leftward position. This operation is depicted in FIGS. 7a and 7b.

In a second step (B), the plunger 148 is positioned above a substrate 146 at a first pre-selected x,y location at which it is desired to locate a top surface of the substrate. For a square or rectangular substrate, a preferred location is towards one of the four corners, as shown in FIG. 2. A third step (C) is to raise platform 147 so that the top surface of substrate 146 contacts the tip 178 of plunger 148 and drives plunger 148 upward. A next step (D) is to detect movement of the plunger 148 to the sensing location. This is done by monitoring a change in the output signal from sensor 162. In the embodiment shown herein, controller 116 monitors signal line 166. A change in the signal signifies that plunger 148 has interrupted the light beam of sensor 162. In a step (E), the controller 116 electrically records in memory 119 the z-axis coordinate of platform 147 corresponding to the time at which the output signal changed. Once step (E) is completed, platform 147 can be lowered. In the embodiment described, when substrate 146 is no longer pushing up against plunger 148, spring 180 will force plunger 148 back to its actuated position. In the absence of spring 180, however, the plunger could be lowered in another manner, such as by force of gravity or by repeating step (A).

A step (F) is to repeat steps (B) through (E) at a plurality of additional pre-selected x,y locations. In the case of a square or rectangular substrate, steps (B) through (E) are preferably repeated at locations in the vicinity of the three other corners of the substrate, to obtain four recorded z-axis positions corresponding to four sets of x,y coordinates.

Figure 8A:
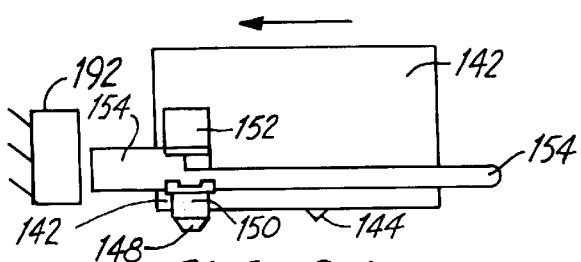
FIGS. 8a and 8b depict the operation of step G of FIG. 6.
Figure 8B:
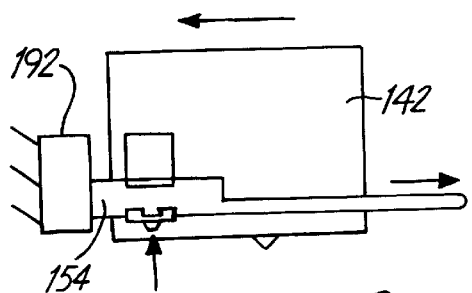

When values have been recorded at all pre-selected substrate locations, the plunger 148 is switched back up to its stored position, in a step (G). In the embodiment shown, this step is executed by moving the extrusion head 142 in the x-direction towards a second stationary block 192 located outside of the modeling envelope 138, to the left of extrusion head 147. The force of block 192 against actuator 154 pushes the actuator 154 to its rightward position. The operation of step (G) in the described embodiment is shown in FIGS. 8a and 8b.

When a z-axis position has been recorded for each pre-selected x, y location, step (H) is performed. In step (H), a "Find-Z" software program loaded into controller. 116 compares the recorded z-axis positions to determine whether the top surface of substrate 146 is approximately parallel to a horizontal, xy-plane. Step (H) is particularly useful for a modeling system that uses a slab substrate. If the result of the comparison shows that the substrate top surface does not closely enough approximate a horizontal plane, that result indicates either that the substrate 146 was not mounted flush to platform 147, or that the substrate 146 has a deformity. In such a case, in a step (I), controller 116 provides a notification to the operator, alerting the operator to reload the substrate 146 onto platform 147 and then repeat the z-axis initialization routine. The notification is preferably by way of a written message on a system display screen (not shown).

If the comparison of step (H) shows that the substrate top surface is parallel to the xy-plane, a step (J) is executed, in which the "Find-Z" software, program uses the recorded z-axis positions to calculate a z-start position of platform 147. The Find-Z program uses known, constant system parameters to derive the actual z-axis position of platform 147 at the time of initial contact between substrate 146 and plunger 148 and to thereby determine an appropriate z-start position of platform 147 with respect to the extrusion head nozzle 144. In the case of a foam slab substrate, step (J) can be executed using the following algorithm:

(1) Subtract the constant value X, representing the predetermined distance of the sensing location above the actuated position of plunger 148, from each recorded z-axis position. The result of this subtraction is a set of actual z-axis positions of platform 147 at the instant that substrate 146 contacted plunger 148.

(2) Select the lowest of the actual z-axis positions.

(3) Add the constant value Y, representing the predetermined distance of the tip of nozzle 144 above the tip 178 of plunger 148, to the selected actual z-axis position. This result of this calculation is the z-axis position at which substrate 146 will contact the tip of nozzle 144.

(4) Add a constant value Z, representing the desired depth of the tip of nozzle 144 below the top surface of substrate 146, to the result of step (3), to arrive at the z-start position.

It will be apparent to those skilled in the art that the above algorithm is but one example of an algorithm that may be used for calculating the z-start position based upon the recorded z-axis positions using the method of the present invention. For instance, steps (1)–(4) may be combined or performed in a different order. Additionally, it should be understood that the appropriate z-start position of platform 147 is dependent upon the particular modeling system and substrate used. Adaptations to the z-start position calculations for various types of modeling systems will be apparent to those skilled in the art. For example, in some cases the desired nozzle tip depth may be zero. In other cases, it may be desirable to begin modeling with the nozzle tip above the top surface of the substrate 146. These specifications can easily be accommodated by the algorithm.

It should further be understood that while step (H) and (I) of the z-axis initialization routine are useful so as to ensure the efficacy of steps (J) and (K), steps (H) and (I) are not necessary to performance of the z-axis initialization routine. Similarly, it should be understood that in a modeling system that uses a thin substrate, such as the flexible sheet substrate described in U.S. Pat. No. 5,939,008, an appropriate z-start position may be accurately determined using the apparatus of the present invention by sensing and recording a z-axis position at a single location of the substrate. In such a case, the comparison and notice of steps (H) and (I) are unnecessary as is step (2) of the algorithm.

EXAMPLE 2

In one alternative embodiment, a statistical analysis is done of the actual z-axis positions in step (2) of the Example 1 algorithm, in place of the selection of the lowest actual z-axis position. Ideally, the top surface of a substrate mounted on the modeling platform would always define a horizontal plane, so that the actual z-axis positions recorded in the method of the present invention would all be the same for a given substrate. As mentioned above, however, in practice a substrate may be deformed, made to inexacting tolerances or improperly mounted on the platform, so that it lacks a horizontal planar surface. The statistical analysis fits a plane to the actual z-axis positions (i.e., a plane oriented at some angle with respect to horizontal), defining a coordinate system fitted to the modeling substrate in which the model can be built. The z-start position is at the z-origin of the coordinate system. The model is then built up in layers which are approximately parallel to the plane of the substrate top surface, whether or not the surface is perfectly horizontal. This embodiment performs a self-correct of substrate surface planarity that can replace the operator correct instruction of step (H) in Example 1. Building the model in the coordinate system of the substrate further provides a nozzle tip depth that is optimized over the substrate as a whole and not just at a single x,y coordinate.

Specifically, the analysis may be performed by finding a plane which is the linear least squares fit to the data points $(X_j, Y_j, Z_j)$ corresponding to a set of i sensed z-axis positions. The plane is defined by the equation:

$$ax+by+cz=1 \qquad \text{Eq. (1)}$$

The corresponding Euler angles are:

$$\theta = \cos^{-1}\left(\frac{c}{\sqrt{a^2+b^2+c^2}}\right) \qquad \text{Eq. (2)}$$

$$\phi = -\tan^{-1}\left(\frac{b}{a}\right) \qquad \text{Eq. (3)}$$

All model vertex positions $(x_j, Y_j, Z_j)$ in the model coordinate system are translated into vertex positions $(\tilde{X}_j, \tilde{Y}j, \tilde{Z}_j)$ of the substrate coordinate system using a rotation matrix dependent upon the Euler angles:

$$\begin{pmatrix} \cos(\phi) & -\cos(\theta)\sin(\phi) & \sin(\theta)\sin(\phi) \\ \sin(\phi) & \cos(\theta)\cos(\phi) & -\sin(\theta)\cos(\phi) \\ 0 & \sin(\theta) & \cos(\theta) \end{pmatrix} \begin{pmatrix} X_j \\ Y_j \\ Z_j \end{pmatrix} = (\tilde{X}_j, \tilde{Y}_j, \tilde{Z}_j) \qquad \text{Eq. (4)}$$

Finally, the constant Y+Z−X−c is added to every $Z_j$, where X, Y and Z are defined as in Example 1.

In the resulting substrate coordinate system, the extrusions in a given build layer vary in z height depending on x and y. Accordingly, the x-y translator need also be operable to translate the extrusion head along the z-axis, at least in a range of motion sufficient to compensate the z-height variation. Adapting the model layers to the substrate top surface results in heightened model quality. It should be noted that the linear least squares analysis illustrated herein is but one of many ways to fit a plane to the measured z-axis positions. As will be recognized by those skilled in the art, there are many equivalent ways to perform the derivation.

EXAMPLE 3

In an alternative embodiment, the tip of nozzle 132 (shown in FIG. 1) can be used as a plunging means to find z-axis positions of the platform. The initialization routine is performed by positioning the nozzle 132 above pre-selected locations of the substrate and raising the platform 134 until the nozzle tip contacts the substrate. Contact between the tip of nozzle 132 and the substrate 128 is monitored by a sensing means and the controller 116 electrically records the z-axis position of platform 134 at the time contact is detected. In an apparatus that uses servo drive motors, contact with the substrate 128 can be detected by simply monitoring a change in the servo drive current without need for any special purpose sensing means.

The Find-Z program works much the same in the present example as described with respect to Examples, 1 or 2 above. Steps (1) and (3) of the algorithm above can be skipped, however, as the recorded z-positions in the present embodiment are the actual z-axis positions of the platform. In other words, this approach eliminates the variables X and Y.

In this embodiment of Example 3, the temperature of the nozzle during the initialization routine may be of concern. If the substrate is made of a heat sensitive material, the tip of nozzle 132 should be cool when it contacts the substrate. Thus, if the machine has been in prior use wherein the nozzle 132 is heated, the nozzle should be cooled before executing the initialization routine.

EXAMPLE 4

In the embodiments of any of the above examples, the autoinitialization method of the present invention can further be used to detect whether the built envelope is cleared before the building of a model begins. This becomes of issue in the case of a modeling system wherein the model is built in a location remote from the user, for example, a user interface at processor 108 by which the user instructs that a part be built by an extruder located in another room. If a prior user builds a model but does not remove the model from the machine, instruction from a next user to build a subsequent model could cause the machine to crush the previous model as the machine starts to build the subsequent model. The present invention can be used to prevent such destruction of a previous model. In this example, the machine looks up the x,y,z coordinates of the last features built on the previous model (stored in memory 119), and feels for the presence or absence of those features employing the sensing techniques of the present invention. If a model is detected at the coordinates of the last features, the machine stops the build and alerts the user to clear the build envelope. The machine continues with the z-axis initialization routine when the envelope is cleared.

EXAMPLE 5

An issue similar to that discussed in Example 4 arises in a case where the modeling is interrupted in the midst of building a part, for example, in the case of a power outage. In such, a case, where the controller 116 has periodically stored a description of the build progress, the controller 116 upon re-booting will know roughly the coordinates of the last features built. To more accurately determine the coordinates at which to continue the build, the machine can feel for features of the model using the sensing techniques of the present invention. The coordinates at which the model is sensed are compared to a set of coordinates defining the model. Considering that some models take many hours to build, applying the present invention in the manner of this example is particularly beneficial so as to allow utilization of partially built models.

Those skilled in the art will recognize that deviations from the structures of the embodiments shown and described herein may be used in practice of the present invention. As noted above, the teaching of this invention is not limited to extrusion-based layered manufacturing systems. The present invention can be employed in a three-dimensional modeling system that does not extrude modeling material from a nozzle, so long as the system would benefit from autoinitialization of the machine as taught herein. Additionally, one skilled in the art would understand that in a modeling system having a dispensing head movable along the z-axis, the plunger could be driven upward in the method of the present invention by lowering the dispensing head instead of raising the modeling platform. Thus, although the present invention has been described with reference to the best mode known to the inventors for practicing their invention, workers skilled in the art will recognize that changes may be made in form and detail without departing from the spirit and scope of the invention.

What is claimed is:

1. In a machine that builds up three-dimensional objects under the control of a controller by depositing modeling material onto a substrate mounted on a platform movable along a z-axis, a method for initializing the machine, the method comprising tile steps of:
    (a) sensing the top surface of a substrate mounted on the platform at multiple x,y locations by driving the substrate against an overhead plunger at each of the locations;
    (b) electrically recording the z-axis positions of the platform corresponding to the sensing of the substrate; and
    (c) using the plurality of recorded z-axis positions to calculate a z-start position of the platform.

2. The method of claim 1 and further comprising the step of:
    automatically positioning the platform at the calculated z-start position.

3. The method of claim 1 and further comprising the steps of:
    comparing the recorded z-axis positions to determine whether the top surface of the substrate is approximately parallel to an xy-plane; and
    providing an operator notification if the top surface of the substrate is determined not to be approximately parallel to the xy-plane.

4. The method of claim 1 wherein step (c) includes performing calculations based on the recorded z-axis positions to define a coordinate system fitted to the substrate top surface.

5. The method of claim 4 and further comprising the step of building an object in the coordinate system of the substrate.

6. In a machine that builds up three-dimensional objects under the control of a controller by depositing modeling material onto a substrate mounted on a platform movable along a z-axis, a method for initializing the machine, the method comprising the steps of:
    (a) sensing the top surface of an object mounted on the platform at multiple x,y locations by driving the object against an overhead plunger at each of the locations;
    (b) electrically recording the z-axis positions of the platform corresponding to the sensing of the object;
    (c) comparing each recorded z-axis position to an expected range of z-axis positions; and
    (d) providing an operator notification if any of the recorded z-axis positions are not within the expected range of z-axis positions.

7. The method of claim 6 and further comprising the step of using the plurality of recorded z-axis positions to calculate a z-start position of the platform, it the recorded z-axis positions are all within the expected range of z-axis positions.

8. In a machine that builds up three-dimensional objects under the control of a controller by depositing modeling material onto a substrate mounted on a platform movable along a z-axis, a method for initializing the machine, the method comprising the steps of:
    (a) positioning a plunging means above a pre-selected x, y location of a substrate mounted on the platform;
    (b) raising the platform to drive a top surface of the substrate against the plunging means;
    (c) electrically detecting contact by the substrate against the plunging means and responsively providing a detection indication;
    (d) responsive to the detection indication of step (c), electrically recording the z-axis position of the platform corresponding to the detected contact between the substrate and the plunging means;
    (e) repeating steps (a) through (d) at a plurality of other pre-selected x, y locations to obtain a plurality of recorded z-axis positions; and
    (f) using the plurality of recorded z-axis positions to calculate a z-start position of the platform.

9. The method of claim 8 and further comprising the step of:
    automatically positioning the platform at the calculated z-start position.

10. The method of claim 8 and further comprising the step of:
    switching the plunging means to a stored position where it will not interfere with the building of an object, after completion of step (e).

11. The method of claim 8 and further comprising the steps of:
    comparing the recorded z-axis positions to determine whether the top surface of the substrate is approximately parallel to an xy-plane; and
    providing an operator notification if the top surface of the substrate is determined not to be approximately parallel to the xy-plane.

12. The method of claim 8 wherein step (f) includes performing calculations based on the recorded z-axis positions to define a coordinate system fitted to the substrate top surface.

13. The method of claim 12 and further comprising the step of:
    building an object in the coordinate system of the substrate.

14. In a machine that builds up three-dimensional objects under the control of a controller by depositing modeling material onto a substrate mounted on a platform movable along a z-axis, a method for initializing the machine, the method comprising the steps of:
    (a) positioning a plunging means above a selected x, y location of the platform;
    (b) raising the platform to drive an object carried by the platform against the plunging means;
    (c) electrically detecting contact by the object against the plunging means and responsively providing a detection indication;
    (d) responsive to the detection indication of step (c), electrically recording the z-axis position of the platform corresponding to the detected contact between the object and the plunging means;

(e) repeating steps (a) through (d) at a plurality of other selected x, y locations of the platform;

(f) comparing the recorded z-axis positions to an expected range of z-axis positions; and (g) providing an operator notification if any of the recorded z-axis positions are not within the expected range of z-axis positions.

15. In a machine that builds up three-dimensional objects under the control of a controller by depositing modeling material onto a substrate mounted on a platform movable along a z-axis, a method for initializing the machine, the method comprising the steps of:

(a) positioning a plunging means above a selected x, y location of an object under construction;

(b) raising the platform to drive the object against the plunging means;

(c) electrically detecting contact by the object against the plunging means and responsively providing a detection indication;

(d) responsive to the detection indication of step (c), electrically recording the z-axis position of the platform corresponding to the detected contact between the object and the plunging means;

(e) repeating steps (a) through (d) at a plurality of other selected x, y locations of the object to obtain a plurality of recorded z-axis positions;

(f) comparing the recorded z-axis positions to a set of coordinates defining the object; and (g) determining the coordinates at which to continue constructing the object based on the results of the comparison.

16. In a machine that builds up three-dimensional objects under the control of a controller by depositing modeling material onto a substrate mounted on a platform movable along a z-axis machine, a method for initializing the machine, the method comprising, the steps of:

(a) positioning a plunging means in a downward position above a pre-selected x, y location of a substrate mounted on the platform;

(b) raising the platform to drive the plunging means upward under force of contact with a top surface of the substrate;

(c) electrically detecting movement of the plunging, means to a sensing location located a predetermined distance along the z-axis from the downward position;

(d) electrically recording the z-axis position of the platform corresponding to the instant in time at which the plunging means is detected at the sensing location;

(e) repeating steps (a) through (d) at a plurality of other pre-selected x, y locations of the substrate to obtain a plurality of recorded z-axis positions; and (f) using the plurality of recorded z-axis positions to calculate a z-start position of the platform.

17. The method of claim 16 and further comprising the step of:

automatically positioning the platform at the calculated z-start position.

18. The method of claim 16 and further comprising the step of:

switching the plunging means to a stored position where it will not interfere with the building of an object, after completion of step (e).

19. The method of claim 16 and further comprising the steps of:

comparing the recorded z-axis positions to determine whether the top surface of the substrate is approximately parallel to an xy-plane; and providing an operator notification if the top surface of the substrate is determined not to be approximately parallel to the xy-plane.

20. The method of claim 16 wherein step (f) includes performing calculations based on the recorded z-axis positions to define a coordinate system fitted to the substrate top surface.

21. In a machine that builds up three-dimensional objects under the control of a controller by depositing modeling material onto a substrate mounted on a platform movable along a z-axis, a method for initializing the machine, the method comprising the steps of:

(a) positioning a plunging means in a downward position above a pre-selected x, y location of a substrate mounted on the platform;

(b) raising the platform to drive the plunging means upward under force of contact with the substrate;

(c) electrically detecting movement of the plunging means to a sensing location located a predetermined distance along the z-axis from the downward position;

(d) electrically recording the z-axis position of the platform corresponding to the instant in time at which the plunging means is detected at the sensing location;

(e) using the recorded z-axis position to calculate a z-start position of the platform; and (f) automatically positioning the platform at the calculated z-start position.

22. In an apparatus for building up three-dimensional objects under the control of a controller by depositing modeling material from the a nozzle of an extrusion head that moves in an xy-plane onto a removable substrate located beneath the extrusion head in a modeling envelope and mounted on a platform that moves along a z-axis, the improvement comprising:

a plunging means mounted to the extrusion head, the plunging means being maintained at a stored position higher than the extrusion head nozzle during deposition of modeling material and switched to an actuated position beneath the extrusion head nozzle to execute an initialization routine;

a sensing means electrically connected to the controller for detecting contact by the substrate against the plunging means and responsively providing a detection indication to the controller; and means for calculating a z-start position for the platform based upon a plurality of recorded z-axis positions of the platform, each recorded z-axis position corresponding to an instant in time at which the sensing means provides a detection indication in response to driving the platform along the z-axis towards the extrusion head while the extrusion head positions the plunging means in the activated position above a unique preselected x, y location of the substrate.

23. The apparatus of claim 22, wherein the plunging means in its actuated position is movable by application of an upward force to a sensing location a predetermined distance above the actuated position, and the sensing means detects contact by the substrate against the plunging means at the sensing location.

24. The apparatus of claim 22 and further comprising:

an actuator coupled to the plunging means for switching the plunger means between its stored and actuated positions.

25. The apparatus of claim 24, wherein the actuator comprises a bar which slides from side to side in response to application of horizontal force, the bar having a rightward position at which it extends past the extrusion head on a right side thereof and a leftward position at which it extends past the extrusion head on a left side thereof, and the bar being coupled to the plunging means by a pin which alternately slides up and down along a ramped groove in the horizontal bar when the bar is moved between its rightward and leftward positions.

26. A sensor assembly for use in finding a z-start position of a modeling platform in an apparatus that builds up three-dimensional objects under the control of a controller by depositing modeling material onto a removable substrate supported by the platform the sensor assembly comprising:

a plunger having a raised stored position and lowered actuated position, the plunger in its actuated position being movable by application of an upward force to a sensing location a predetermined distance above the actuated position;

a sensor for providing an electrical signal to the controller indicating whether the plunger is detected at the sensing location; and an actuator coupled to the plunger for switching the plunger from its stored position to its actuated position for use in executing a z-axis initialization routine and switching the plunger back to its stored position upon completion of the routine, wherein the actuator comprises a bar which slides from side to side in response to application of horizontal force, the bar having a rightward position at which it extends past the plunger on a right side thereof and a leftward position at which it extends past the plunger on a left side thereof.

27. The apparatus of claim 26, wherein the bar is coupled to the plunger by a pin which alternately slides up and down along a ramped groove in the bar when the bar is moved between its rightward and leftward positions.

* * * * *

UNITED STATES PATENT AND TRADEMARK OFFICE
CERTIFICATE OF CORRECTION

PATENT NO. : 6,629,011 B1  Page 1 of 1
DATED : September 30, 2003
INVENTOR(S) : Joseph L. Calderon et al.

It is certified that error appears in the above-identified patent and that said Letters Patent is hereby corrected as shown below:

Column 11,
Line 22, delete "tile", insert -- the --

Column 12,
Line 1, delete "it", insert -- if --

Column 14,
Line 33, delete "the"
Line 66, delete "plunger", insert -- plunging --

Signed and Sealed this

Twenty-first Day of September, 2004

JON W. DUDAS
*Director of the United States Patent and Trademark Office*